Nov. 15, 1932. H. F. PHILLIPS Re. 18,653
PISTON AND SKIRT EXPANDING RING THEREFOR
Original Filed May 16, 1930
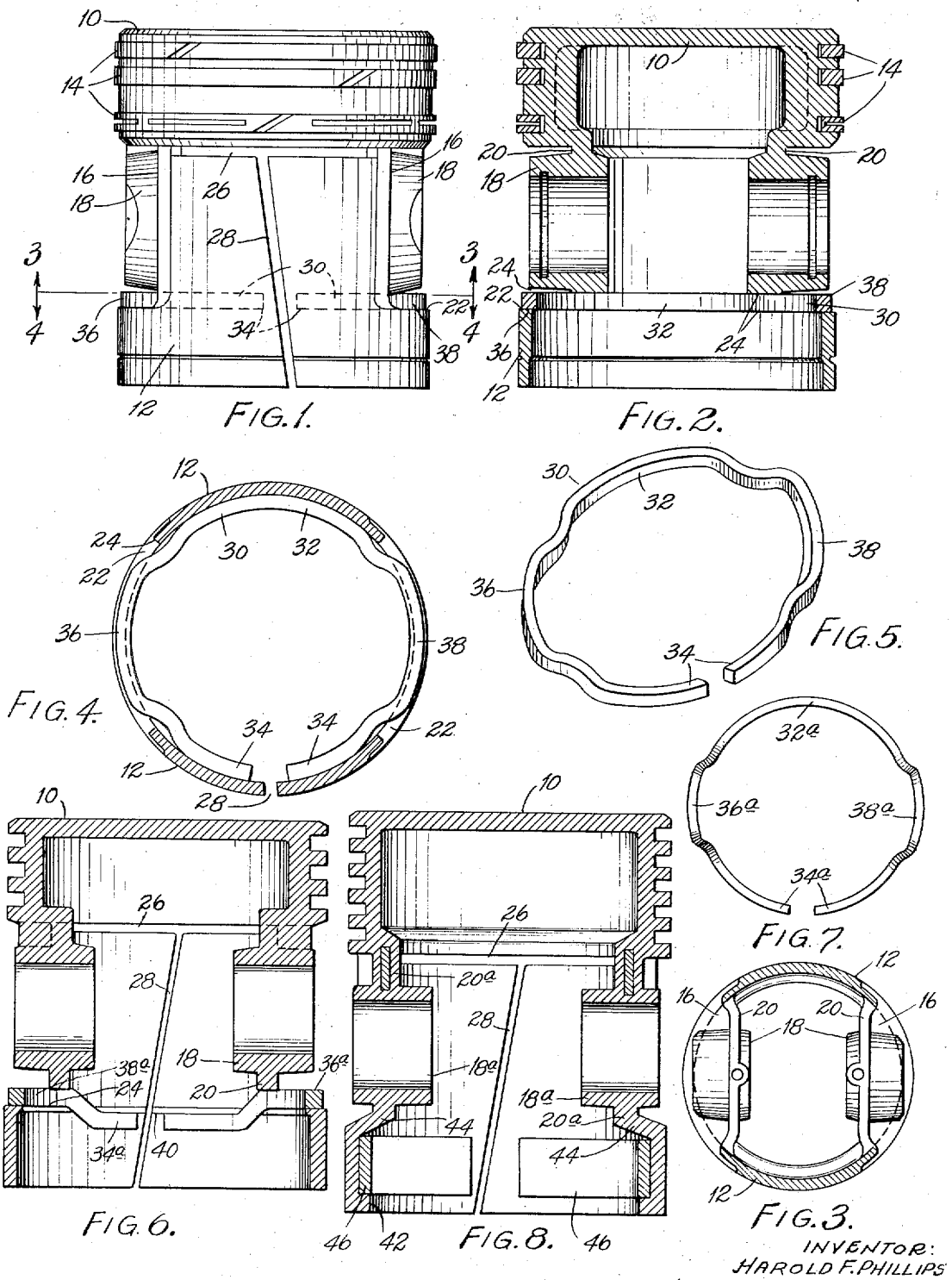
INVENTOR:
HAROLD F. PHILLIPS
BY Harry A. Reiner
ATTORNEY.

Reissued Nov. 15, 1932

Re. 18,653

UNITED STATES PATENT OFFICE

HAROLD F. PHILLIPS, OF BELMONT, MASSACHUSETTS

PISTON AND SKIRT EXPANDING RING THEREFOR

Original No. 1,806,416, dated May 19, 1931, Serial No. 452,936, filed May 16, 1930. Application for reissue filed February 10, 1932. Serial No. 592,155.

My invention has relation to improvements in pistons for internal combustion engines and to spring elements for expanding the skirts of the pistons.

A common type of piston is composed of aluminum or an alloy thereof which has the property of expanding under heat to a considerably greater degree than the iron or iron alloy cylinder in which it reciprocates. To permit the engine to run quietly and without piston slap when the engine is cold, the cold piston is designed to fit the cold cylinder with but little clearance. As the piston becomes heated in operation it expands and in order to prevent this expansion from causing the piston to bind in the cylinder it is common practice to slot the piston skirt horizontal on one or both sides opposite the wrist pin bosses under the piston rings, and also to provide a substantially vertical slot in the skirt from the bottom of the piston to one of said horizontal slots. With this arrangement a certain degree of resiliency is imparted to the piston permitting of circumferential expansion under the heat of operation without causing the pin to "hang up" or bind in the cylinder. However, the inherent resiliency of aluminum or alloy comprising the pistons is not sufficient to enable the piston to hug the cylinder wall under all conditions and the piston soon becomes loose in the cylinder producing a piston slap under ordinary conditions. This disadvantage is generally recognized by mechanics and others skilled in the automotive art.

It is the object of the present invention to maintain the piston in its normal configuration under all conditions of operation by inserting within the piston skirt an expansible ring, or spring, which bears constantly on the inner surface of the piston skirt and compensates for wear on the outer surface of the spring. The expanding spring also serves to overcome any tendency of the metal of the piston to assume a permanent set, as it at all times forces the skirt yieldingly against the cylinder wall.

Internal piston rings or springs for this general purpose have been proposed heretofore but all have necessitated the development of peculiar forms of pistons to retain the rings, which have hindered the commercial adoption of a ring for this purpose. For instance, certain designs have provided constructions not essential to the design of the piston in which the ring is located.

It is a further object of this invention to take advantage of the design of pistons now in commercial use and provide expansion rings that can be inserted in the majority of common types of pistons with little or no alteration of the piston.

A common type of piston has opposed passages under the wrist pin bosses or webs and over portions are ledges of the skirt which are availed of to securely hold the expansion ring in place so that no axial displacement, or rotation, of the ring in the piston occurs.

An essential feature of the invention is that the expanding spring, or ring, exerts its outward pressure against the inside of the piston skirt at separated points so that the expansion of the piston skirt may be concentrated where most needed. This advantage, as well as others inherent in the invention, will be more readily apparent from a detailed description thereof in connection with the accompanying drawing, in which:

Fig. 1 is a side elevation of a piston with which the invention is associated.

Fig. 2 is a sectional elevation through the piston of Fig. 1.

Fig. 3 is a sectional detail taken along line 3—3 of Fig. 1.

Fig. 4 is a section view taken along line 4—4 of Fig. 1.

Fig. 5 is a perspective view of the internal expansion ring of the piston of Fig. 1.

Fig. 6 is a section elevation of a modified form of piston and the expansion ring therefor.

Fig. 7 is a plan view of the ring of Fig. 6.

Fig. 8 is a view similar to Fig. 6 but illustrating a further modified form of piston.

The piston illustrated in Figs. 1 to 4, inclusive, has the flat head 10 and the cylindrical skirt 12 the upper part of which has ring grooves in which the usual external piston, or gas-sealing rings 14 are located. The opposite sides of the skirt have depressions 16 in which the wrist pin bosses 18 are located, which bosses are connected to the skirt at the sides of the depressions by vertical webs 20. The bottoms of the depressions are open to the interior of the piston and to this end the lower portions of the skirt, at the depressions, are provided with horizontal ledges 22 which are located below the bottom faces of the webs 20 so that there are passages 24 through opposite sides of the piston skirt under said ledges 22. I take advantage of this construction in my invention. The skirt is provided with opposite horizontal slots 26 immediately under the piston rings and above the bosses 18 and through the sides opposite said bosses. The skirt also has a generally vertical slot 28, which may be somewhat inclined, as illustrated, and which extends from the bottom edge of the skirt into one of said horizontal grooves 26. By this construction, the skirt can expand circumferentially into the slot 28 under heat without undue enlargement of its external diameter. However, as stated above, the skirt does not always return to its original position after it has been highly heated and, in accordance with this invention, I provide an internal ring 30 which is concentric with the piston and bears on the inner face of the skirt and forces it outwardly so that it is constrained to return to its original configuration as it cools.

Said ring 30 is preferably of square, although it can be of other substantial cross-section, and it is composed preferably of tempered steel and has a considerable degree of resistance to deformation so that it is highly resilient. It has two opposed circular portions 32 and 34 which fit snugly within opposed portions of the piston skirt under the slots 26 and immediately under the bosses 18 and bear outwardly upon the skirt with considerable pressure. The ring has confronting ends which are located in one of said portions and on opposite sides of the vertical slot 28. The ring also is formed with other opposed circular portions 36 and 38 which are at right angles to the portions 32 and 34, and are struck from a longer radius and are located in the passages 24 under and in engagement with the webs 20 and over and in engagement with the shoulders or ledges 22 of the skirts. The ring is thus held against displacement axially of the cylinder and also is held against rotation so that the ends of the ring are positively located on opposite sides of the slot 28 where they are most effective in forcing the skirt outwardly. The circular portions 36 and 38 are inset within the diameter of the skirt so that they cannot come in contact with, and score, the cylinder wall. It is apparent that the portions 36 and 38 of the ring 30 do not bear against the piston wall, hence there is no outward pressure on the piston wall below the wrist pin bosses 18. All of the tension of the ring 30 is exerted against the piston wall adjacent to the slot 28 thereof and directly opposite to said slot so that the piston skirt will be expanded principally at right angles to the wrist pin bosses. This is desirable since there is a tendency for the piston to suffer the greatest amount of wear on its surfaces at right angles to the wrist pin axis. Then, too, the teetering of the piston on the wrist pins, as it reciprocates back and forth in the cylinder, introduces further wear and finally results in a piston slap if no means are employed to prevent this action. The expansion of the piston skirt at right angles to the teetering axis compensates for wear as rapidly as it occurs and prevents teetering with its resulting piston slap. If the pressure of the ring 30 were uniformly distributed entirely around the piston skirt the expansion of the skirt would be substantially uniform across all its diameters and would not be nearly so effective in taking up the excessive clearance due to wear, or preventing teetering.

In the modification illustrated in Fig. 6, the piston is provided with an internal annular shoulder 40 which is close to and, in some instances, merges into the opposed passages 24 so that the ring may be caused to be seated partly over the shoulder. In order to seat the ring firmly on the inner face of the piston the inner circular portions 32*a* and 34*a* are depressed below the outer portions 36*a* and 38*a* so that they can be seated on the piston under said shoulder 40.

In the modification illustrated in Fig. 8, the piston is provided with an inwardly directed annular flange or ledge 42 and the webs 20*a* that support the wrist pin bosses 18*a* have inclined sections 44 that connect them with that portion of the skirt beneath the bosses. In this instance the piston lacks the passages 24. Advantage is taken of this construction in providing an internal expansion ring 46 which is wide, or is of large axial extent, as compared with the previously described rings and is located above said flange or ledge 42 and under the sections 44 and engages both and so is held positively against axial displacement. In this instance the ring has no means that cooperates with an essential part of the piston in retaining the ring against rotary movement; and it is considered that none is needed as there is a comparatively large area of ring that is in contact with the piston and so holds it against rotation.

Having described my invention, I claim:

1. A piston having a slotted skirt, wrist pin bosses, and other parts essential to the construction thereof, in combination with an expansion ring which is located concentrically within the piston at the skirt thereof and has opposed sections that bear outwardly upon the inner face of and holds said skirt resiliently expanded and other opposed sections that lie between and project circumferentially beyond said first opposed sections and which engages on the top and bottom sides thereof parts of the piston that constitute abutments by which said ring is retained in position against displacement axially of the piston.

2. A piston having a slotted skirt, wrist pin bosses, and other parts essential to the construction thereof, in combination with an expansion ring which is located concentrically within and has opposed sections that bear outwardly upon the inner face of and hold said skirt resiliently expanded and other opposed sections that lie between and project circumferentially beyond said first opposed sections and which engage on the top and bottom sides thereof parts of the piston that constitute abutments by which said ring is retained in position against displacement axially of the piston and also against rotation within the piston.

3. A piston having a slotted skirt, wrist pin bosses, and webs which connect said bosses and skirt, in combination with an expansion ring which is located concentrically within said skirt and engages the inner face of and resiliently holds said skirt expanded, said ring having engagement at one side with said webs and on the opposite side with a ledge of said skirt whereby said ring is held against displacement axially of the piston.

4. A piston having a slotted skirt, wrist pin bosses, and webs which connect said bosses and skirt, in combination with an expansion ring which is located concentrically within said skirt and engages the inner face of and resiliently holds said skirt expanded, said ring having engagement at one side with said webs and on the opposite side with a ledge of said skirt whereby said ring is held against displacement axially of the piston, said ring also having engagement with another part of said skirt by which it is held against rotation.

5. A piston having a slotted skirt, wrist pin bosses, said skirt having opposed recesses which are open to the interior of the piston, in combination with an expansion ring which is located concentrically within said skirt and bears outwardly on the skirt beyond said recesses and resiliently holds said skirt expanded and which has opposed parts which are located in said opposed recesses.

6. A piston having a slotted skirt, wrist pin bosses, and opposed passages which extend through said skirt, in combination with an expansion ring which is located concentrically within said skirt and bears outwardly on and resiliently holds said skirt expanded and which has opposed parts which are located in said opposed passages and which engage axially opposed parts of said piston by which the ring is held against displacement axially of the piston.

7. A piston having a slotted skirt, wrist pin bosses, and opposed passages which extend through said skirt, in combination with an expansion ring which is located concentrically within said skirt and bears outwardly on and resiliently holds said skirt expanded and which has opposed parts which are located in said opposed passages and which engage axially opposed parts of said piston by which the ring is held against displacement axially of the piston, said ring being located between axially opposed parts of said piston by which the ring is held against displacement axially of the piston.

8. A piston having a slotted skirt, wrist pin bosses, and opposed passages which extend through said skirt under said bosses, in combination with an expansion ring which is located concentrically within and bears outwardly on said skirt and which has opposed parts which are located in said opposed passages.

9. A piston having a slotted skirt, wrist pin bosses, and opposed passages which extend through said skirt under said bosses, in combination with an expansion ring which is located concentrically within and bears outwardly on said skirt and which has opposed parts which are located in said opposed passages and are seated on ledges of said skirt at said passages and engage parts of said bosses whereby the ring is held against displacement in both directions axially of the piston.

10. A piston having a slotted skirt and opposed passages therethrough and wrist pin bosses having webs which are located above said passages and connect said bosses and skirt, in combination with an expansion ring which is located concentrically within and bears outwardly on said skirt and has opposed parts which are located in said passages and at the top engage the lower faces of said webs and at the bottom are seated on ledges of said skirt whereby the ring is held against displacement in both directions axially of the piston.

11. A piston having a slotted skirt and opposed passages therethrough and wrist pin bosses having webs which are located above said passages and connect said bosses and skirt, in combination with an expansion ring which is located concentrically within and bears outwardly on said skirt and has opposed parts which are located in said passages and at the top engage the lower faces of said webs and at the bottom are seated on ledges of said skirt whereby the ring is held against displacement in both directions axially of the piston, said opposed parts also engaging the opposite sides of said passages by which the ring is held against rotation.

12. A piston having a slotted skirt, wrist pin bosses, and opposed passages which extend through said skirt, in combination with an expansion ring which is located concentrically within said skirt and bears outwardly on and resiliently holds said skirt expanded and which has opposed parts which are located in said opposed passages and have intermediate skirt-engaging parts which are offset from the plane of said opposed parts.

13. A piston having a slotted skirt and opposed passages therethrough, and an internal annular ledge that is located mainly under said passages, in combination with an expansion ring which has opposed parts that are located in said passages and intermediate parts that are offset from the plane of said opposed parts that are seated on the inner face of the skirt below said ledge and urge said skirt outwardly.

14. A piston having a skirt, wrist pin bosses and opposed passages in said skirt under said wrist pin bosses, and an expansion ring which has parts located in said passages and retained against axial displacement by engagement with the upper and lower sides of said passages and other parts which bear outwardly on the inner face of said skirt beyond said passages.

15. A piston having a slotted skirt, opposed wrist pin bosses, webs that connect said bosses with said skirt, and skirt having opposed passages therethrough under said webs, in combination with an expansion ring which has opposed circular parts located in said passages and engaged on opposite sides by said skirt and said webs by which the ring is held against displacement axially of the piston and having intermediate parts of lesser diameter which engage and press outwardly on the inner face of said skirt.

16. An internal expansion ring for pistons having opposed circular ring-locking parts, and intermediate circular piston-expanding parts of lesser diameter.

17. An internal expansion ring for pistons having opposed circular ring-locking parts, and intermediate circular piston-expanding parts of lesser diameter, the ring having confronting ends which are located in one of said intermediate parts.

18. An internal expansion ring for pistons having opposed circular ring-locking parts, and intermediate circular piston-expanding parts of lesser diameter which are offset from the plane of said opposed parts.

19. An internal expansion ring for pistons having opposed circular ring-locking parts and intermediate circular piston-expanding parts of lesser diameter which are offset from the plane of said opposed parts, the ring having confronting ends which are located in one of said intermediate parts.

20. In combination with a longitudinally slotted piston adapted for operation in an engine cylinder, a split ring expanding element positioned in the skirt of the piston with its split adjacent to the slot in the piston, said expanding element having contact with and exerting pressure on the piston skirt at points adjacent to both sides of the slot and opposite thereto, and clearance between said element and parts of the skirt at right angles to the parts contacted.

21. In combination with a piston having wrist pin bosses and a skirt provided with a longitudinal slot in the part thereof between the bosses, a spring ring expanding element in said skirt and exerting pressure thereon at points only adjacent said slot and opposite thereto for expanding the skirt at right angles to the axis of said bosses.

22. In combination with a piston having wrist pin bosses and a skirt provided with a longitudinal slot in the part thereof between the bosses, a spring ring expanding element in said skirt and exerting pressure thereon at points only adjacent said slot and opposite thereto for expanding the skirt at right angles to the axis of said bosses, and means for locking said expanding element in place.

In testimony whereof I hereunto affix my signature.

HAROLD F. PHILLIPS.